United States Patent [19]

Shiraishi

[11] Patent Number: 4,838,666
[45] Date of Patent: Jun. 13, 1989

[54] WIDE ANGLE ZOOM LENS OF LONG BACK FOCAL DISTANCE

[75] Inventor: Akihiko Shiraishi, Kanagawa, Japan

[73] Assignee: Canon Kabushiki Kaisha, Tokyo, Japan

[21] Appl. No.: 125,571

[22] Filed: Nov. 25, 1987

[30] Foreign Application Priority Data

Nov. 27, 1986 [JP] Japan .................................. 61-282266

[51] Int. Cl.$^4$ .......................... G02B 15/16; G02B 9/64
[52] U.S. Cl. ..................................... 350/427; 350/450
[58] Field of Search ................................. 350/427, 450

[56] References Cited

FOREIGN PATENT DOCUMENTS 0143311  8/1983  Japan ..................................... 350/427

*Primary Examiner*—Bruce Y. Arnold
*Assistant Examiner*—Rebecca D. Gass
*Attorney, Agent, or Firm*—Fitzpatrick, Cella, Harper & Scinto

[57] ABSTRACT

A wide angle zoom lens of increased back focal distance comprising, from front to rear, a first lens unit of negative power, a second lens unit of positive power, and a third lens unit of positive power, the first and second lens units axially moving in differential relation to effect zooming, while holding the third lens unit stationary, and satisfying the following conditions:

$$2.0 \leq |f_1/f_W| \leq 3.2$$

$$0.33 \leq |f_1/f_2| \leq 0.8$$

where $f_1$ and $f_2$ are the focal lengths of the first and second lens units, respectively, and $f_W$ is the shortest focal length of the entire lens system.

7 Claims, 12 Drawing Sheets

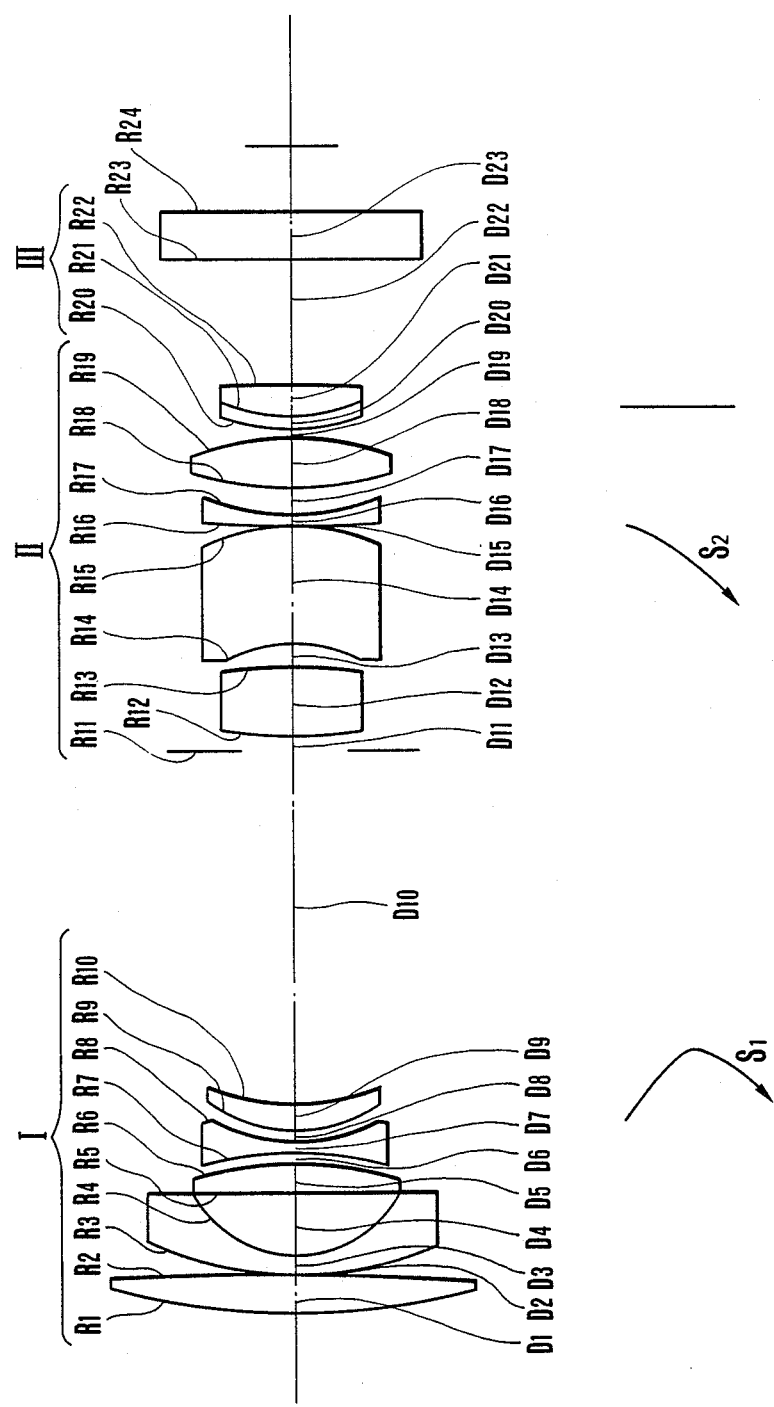
F I G. 1

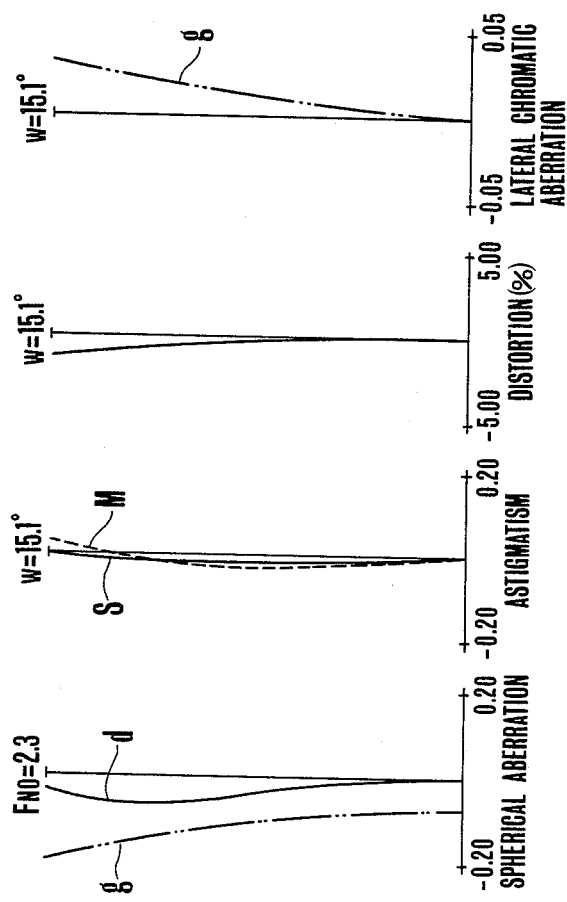
F I G. 16

WIDE ANGLE ZOOM LENS OF LONG BACK FOCAL DISTANCE

BACKGROUND OF THE INVENTION

1. Field of the Invention

This invention relates to wide angle zoom lenses of long back focal distance and, more particularly, to zoom lenses suited to electronic photographic cameras.

2. Description of the Related Art

In recent years, along with the advancement of art of video cameras, many studies have been devoted to development of an electronic still camera. This camera has its effective picture frame made small in size as compared with the single lens reflex camera using 35 mm photographic film, roughly on the order of 11 mm in diagonal length. Also, the use of the through-the-lens type finder in the electronic still camera leads to the necessity of arranging a reflection mirror in front of the photosensitive material to direct part of the light entering through the photographic lens to the finder system likewise as in the single lens reflex camera. In addition thereto, a low pass filter, an infrared cut filter and other glass members are very often used in the electronic still camera. From these reasons, the photographic lens for use in the electronic still camera has, despite the relatively small picture frame, to have its back focal distance considerably elongated as compared with the single lens reflux camera using silver halide film.

Numerically speaking, in the electronic still camera having the effective picture frame of diagonal length L, the back focal distance is equal to 2.1L or thereabout, being far longer than in the conventional photographic lens.

In general, to facilitate elongation of the back focal distance, the lens system must be formed to the inverted telephoto type, as comprising a front lens unit of strong negative power and a rear lens unit of positive power.

However, if the refractive power of each of the lens units is strengthened in order to obtain an adequately long back focal distance, the difficulty of correcting aberrations is increased.

In connection with the zoom lens for use in the single lens reflex camera, it is to be noted that a compact form of wide angle zoom lens is disclosed in U.S. patent application Ser. No. 450,742 filed on Dec. 17, 1982 and assigned to the assignee of the present invention.

SUMMARY OF THE INVENTION

A first object of the invention is to provide a high range wide angle zoom lens of increased back focal distance in relation to the diagonal length of the effective picture frame.

A second object is to provide a zoom lens corrected for high grade of optical performance.

To achieve these objects, one of the features of lens design of the invention is that the zoom lens comprises, from front to rear, a first lens unit having a negative refractive power, a second lens unit having a positive refractive power, and a third lens unit having a positive refractive power, the third lens unit remaining stationary during zooming, and the first and second lens units being moved along an optical axis in differential relation to effect zooming, and satisfying the following conditions:

$$2.0 \leq |f_1/f_W| \leq 3.2$$

$$0.33 \leq |f_1/f_2| \leq 0.8$$

where $f_W$ is the shortest focal length of the entire lens system, and $f_1$ and $f_2$ are the focal lengths of the first and second lens units respectively.

Another feature is that the zoom lens comprises, from front to rear, a first lens unit having a negative refractive power, a second lens unit having a positive refractive power, and a third lens unit having a positive refractive power, the third lens unit remaining stationary during zooming, and the first and second lens units being axially moved to effect zooming, wherein the second lens unit comprises, from front to rear, a positive lens, a thickest meniscus lens of forward concavity among the constituent lenses of the second lens unit, a negative meniscus lens and a bi-convex lens, and further an aperture stop is positioned adjacent the positive lens in the second lens unit.

BRIEF DESCRIPTION OF THE DRAWINGS

FIGS. 1, 5, 9 and 13 are longitudinal section views of numerical examples 1, 2, 3 and 4 of zoom lenses of the invention respectively.

FIGS. 14, 15 and 16 are graphic representations of the aberrations of the numerical example 4 in the wide angle, intermediate and telephoto positions respectively with an object at infinity.

In the graphs, g and d designate the g- and d-lines of the spectrum respectively, and S and M designate the sagittal and meridional image surfaces respectively.

DETAILED DESCRIPTION OF THE PREFERRED EMODIMENT

Figure 2:
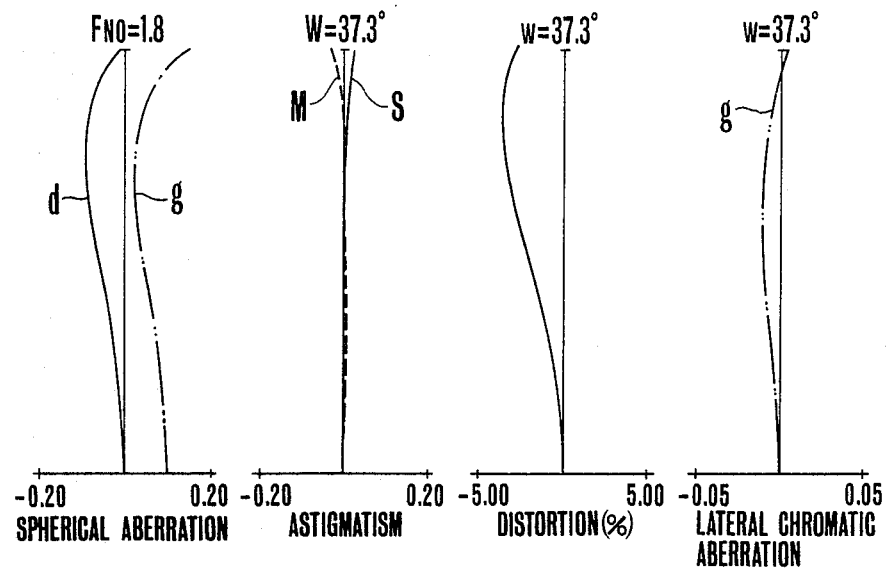
FIGS. 2, 3 and 4 are graphic representations of the aberrations of the numerical example 1 in the wide angle, intermediate and telephoto positions respectively with an object at infinity.
Figure 3:
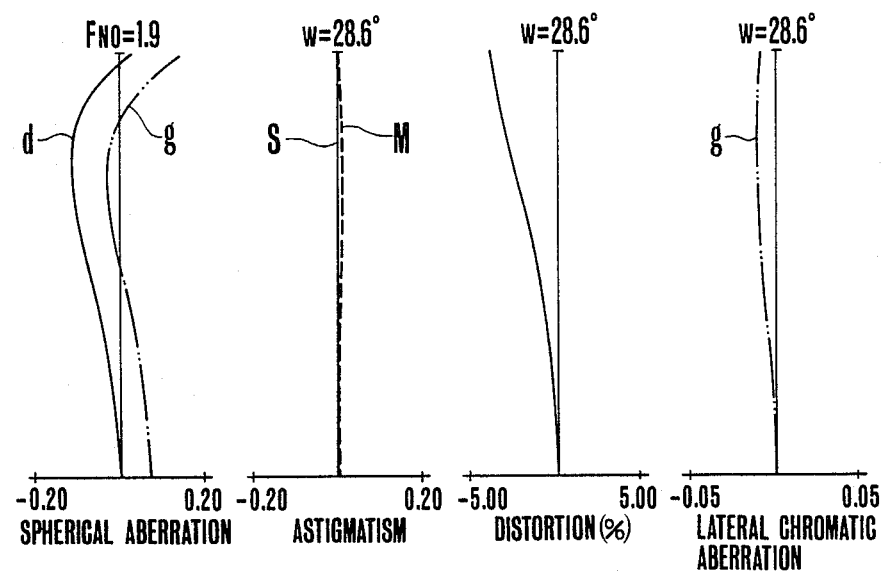
Figure 4:
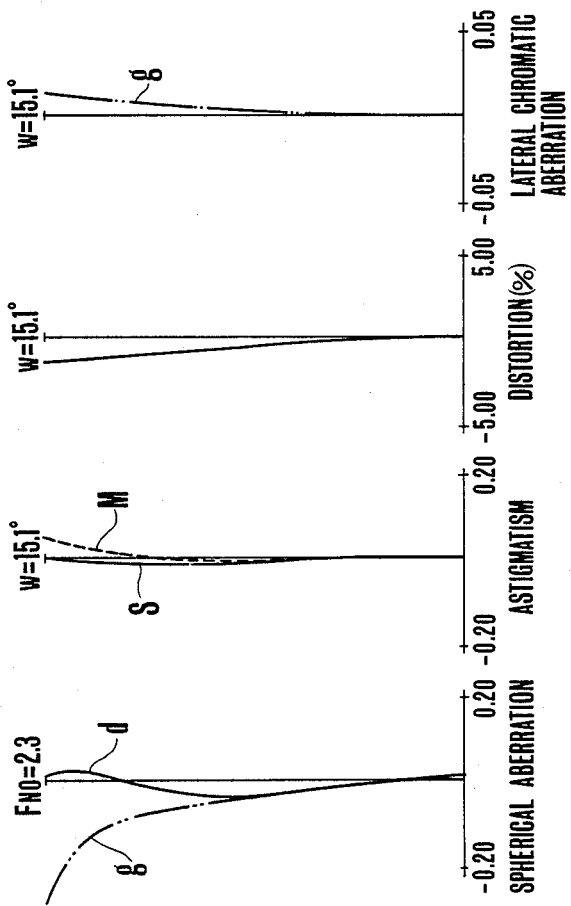
Figure 5:
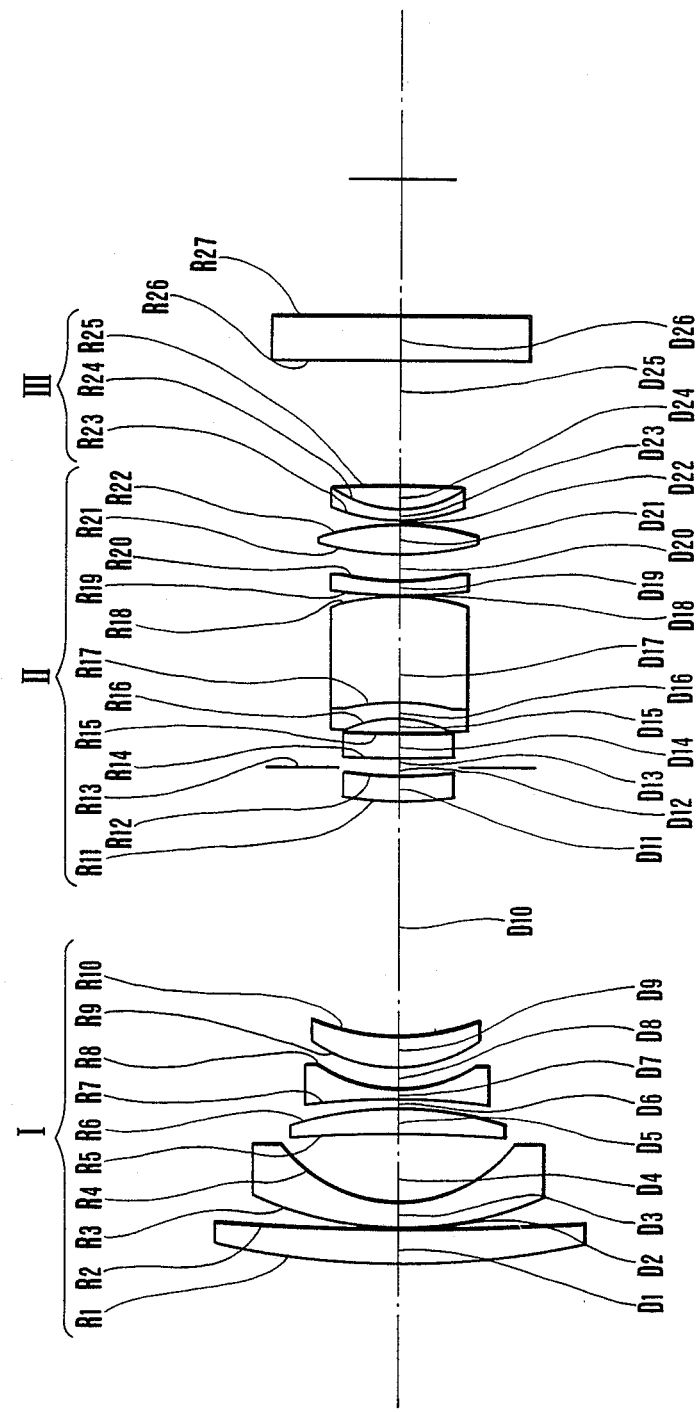
Figure 6:
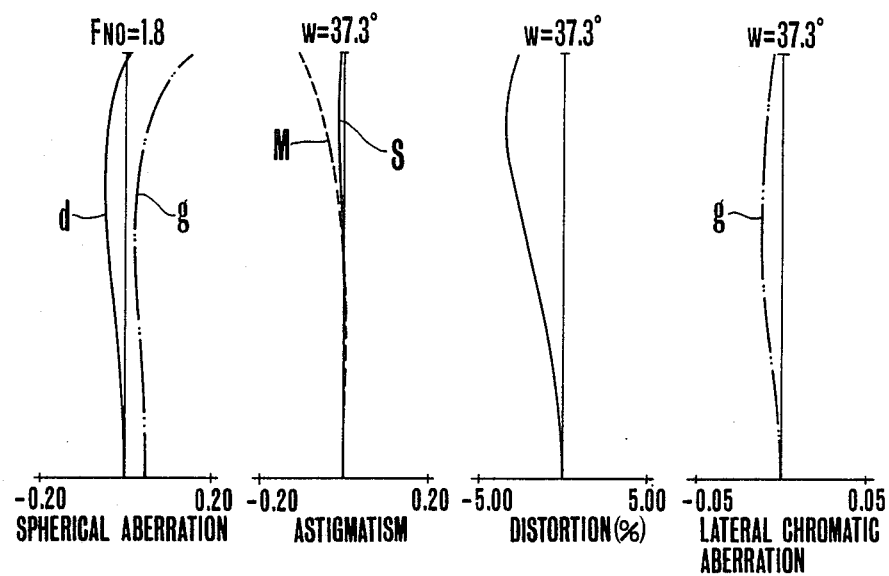
FIGS. 6, 7 and 8 are graphic representations of the aberrations of the numerical example 2 in the wide angle, intermediate and telephoto positions respectively with an object at infinity.
Figure 7:
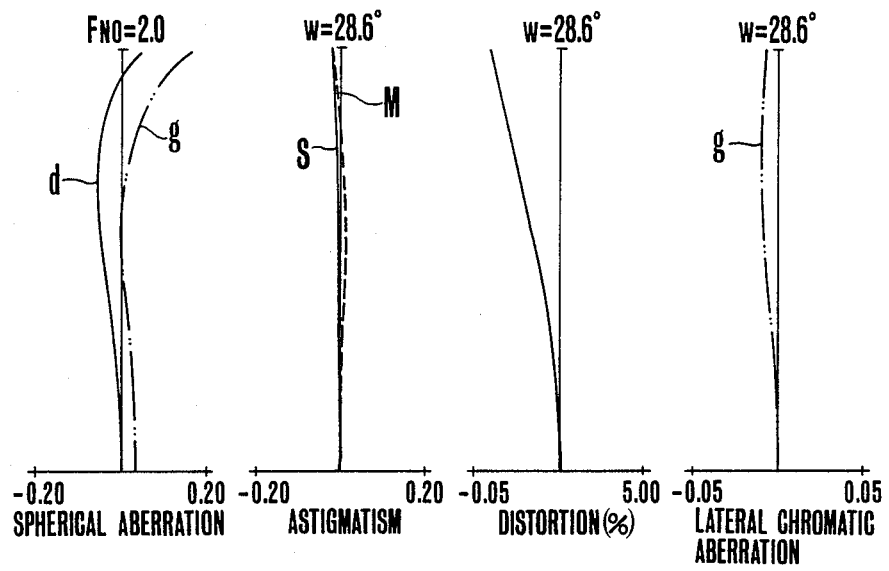
Figure 8:
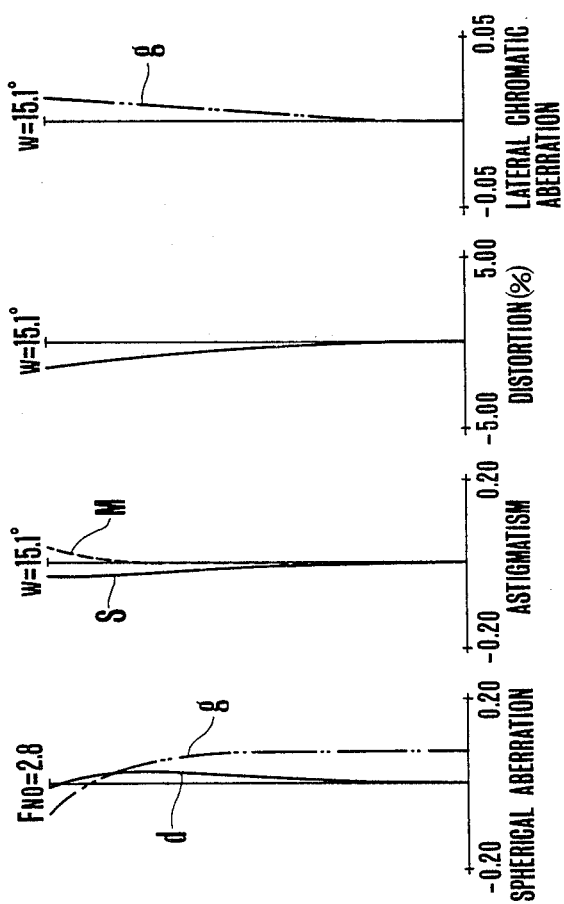
Figure 9:
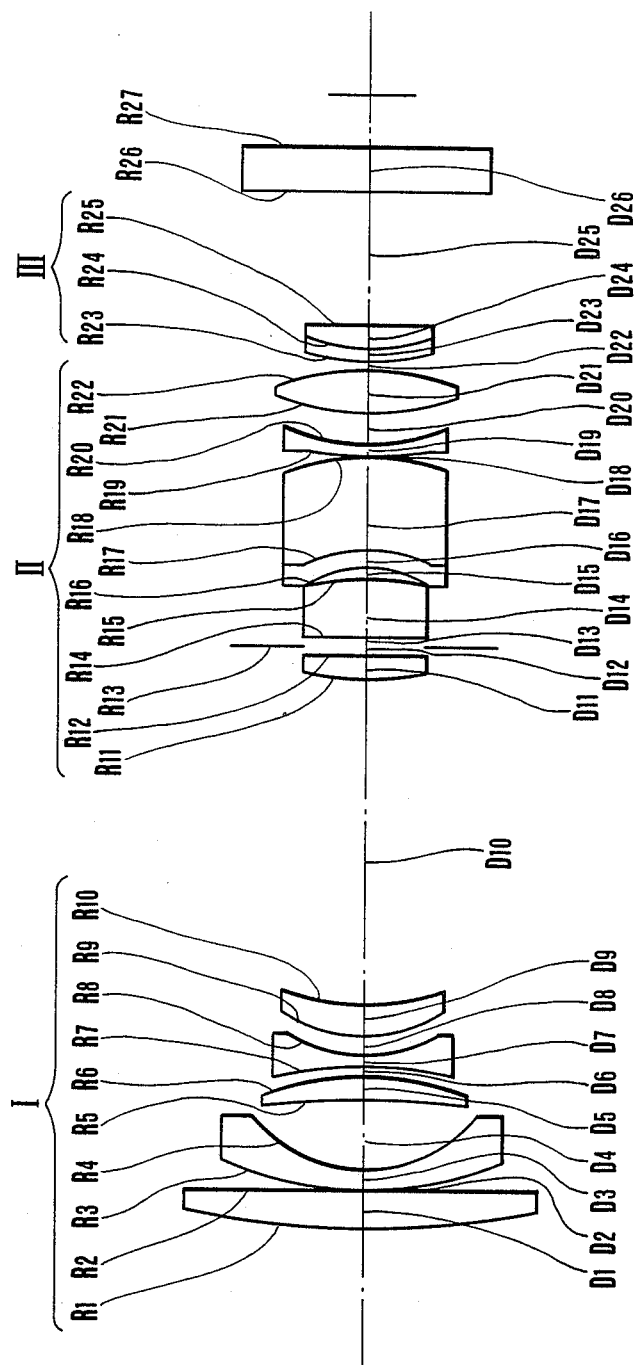
Figure 10:
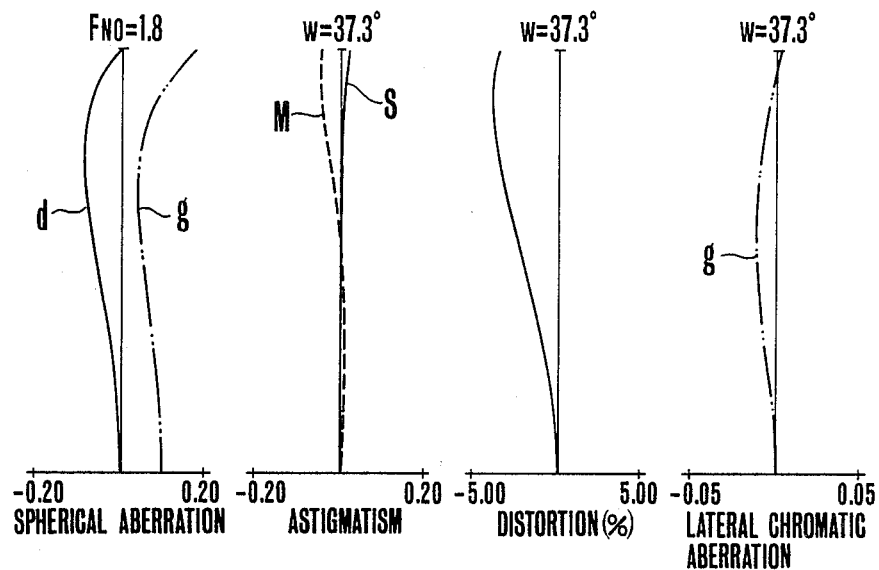
FIGS. 10, 11 and 12 are graphic representations of the aberrations of the numerical example 3 in the wide angle, intermediate and telephoto positions respectively with an object at infinity.
Figure 11:
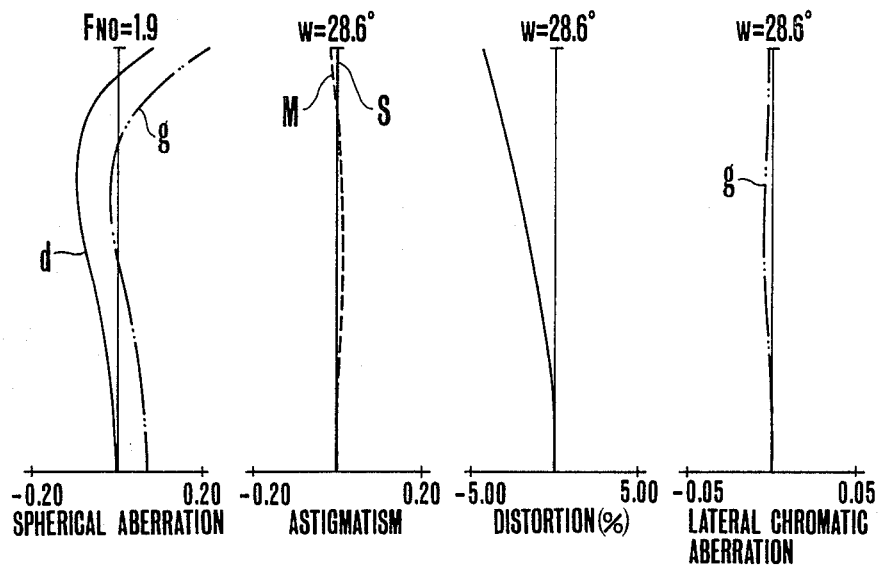
Figure 12:
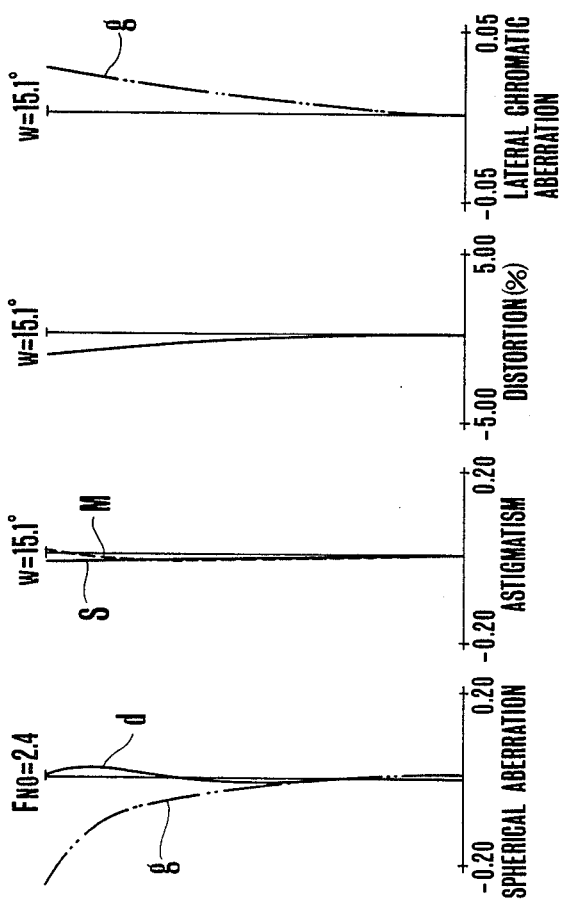
Figure 13:
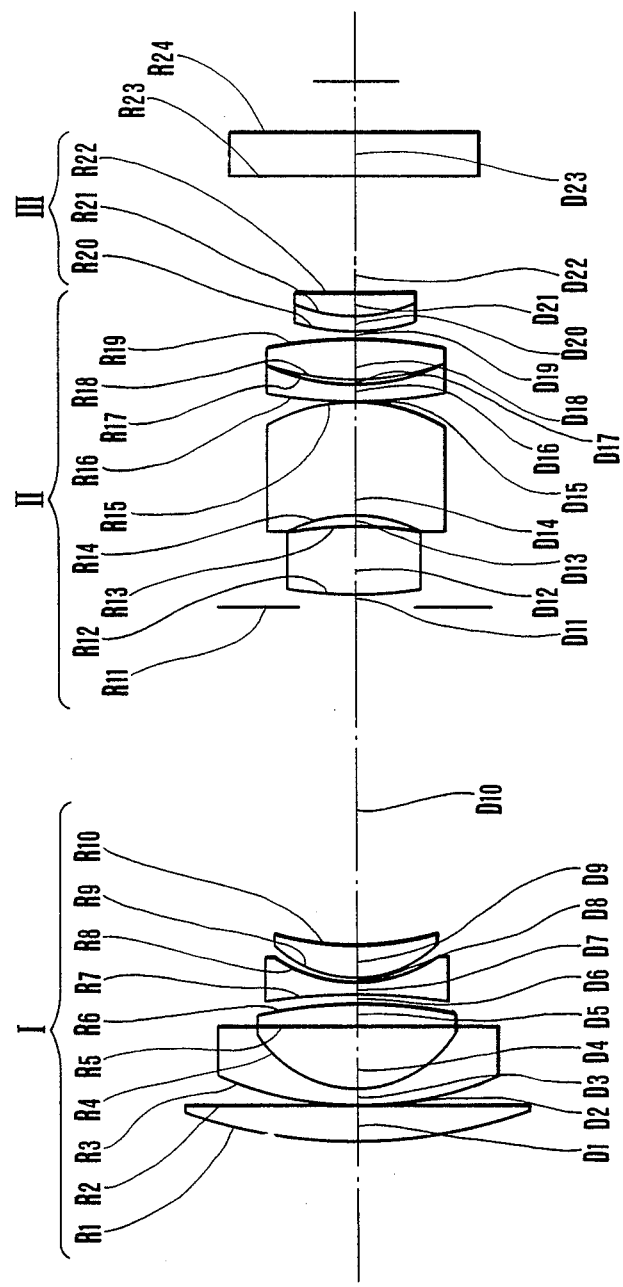
Figure 14:
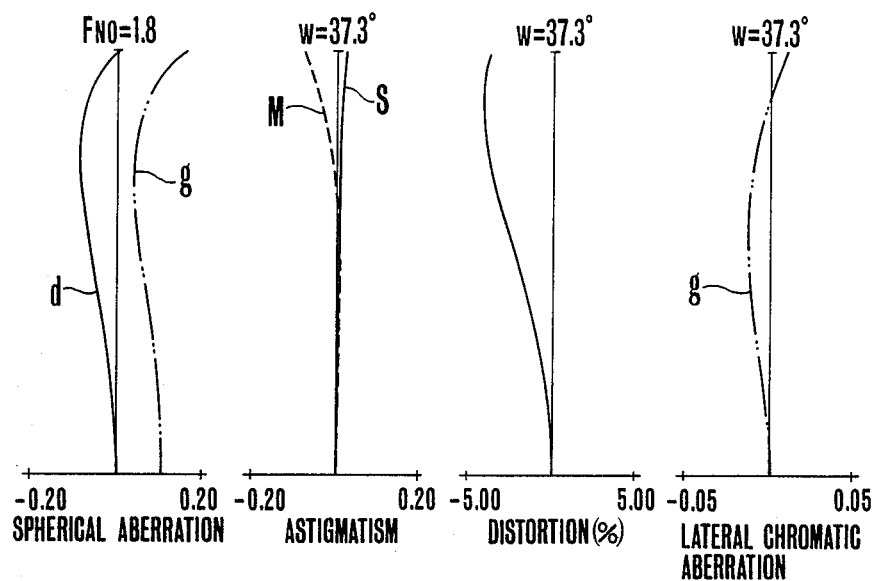
Figure 15:
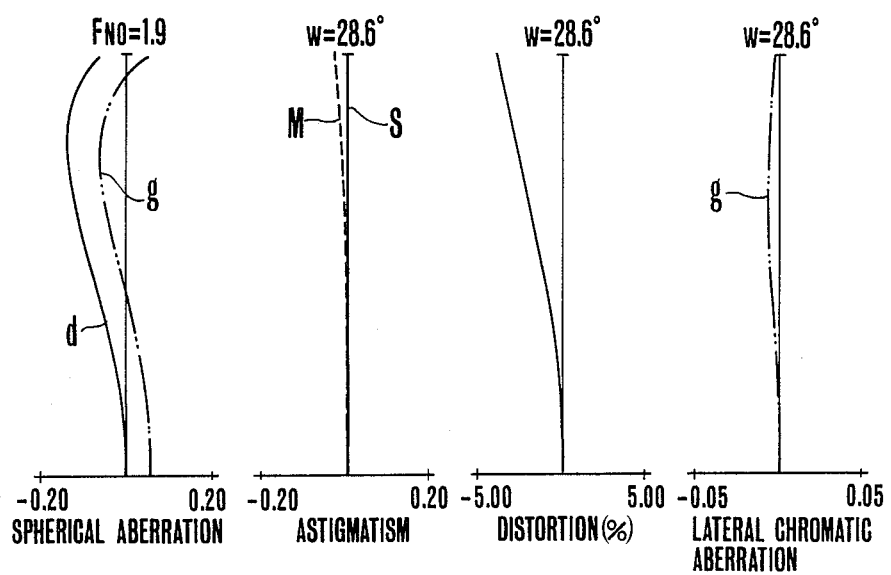

In FIGS. 1, 5, 9 and 13, there is shown an embodiment of the invention. The zoom lens comprises, from front to rear, a first lens unit I having a negative refractive power, a second lens unit II having a positive refractive power and a third lens unit III having a positive refractive power. And, when zooming, as from the wide angle to the telephoto side, the first lens unit moves axially in a locus convex toward the rear as shown by an arrow $S_1$, while the second unit moves axially forward monotonously as shown by an arrow $S_2$. The second lens unit II carries a diaphragm for determining an F-number either on the object side thereof, or just behind the frontmost lens therein.

In general, the elongation of the back focal distance to an adequate value calls for strengthening of the refractive power of each lens unit, as has been described before. This results in an increase of the difficulty of correcting, for example, astigmatism. Also, the Petzval sum tends to increase to the negative direction.

So, in the invention, for the purpose of the power reduction, both the first lens unit and the second lens unit have a weak refractive power, so that a composite focal length of the zoom section comprised of the first and second lens units is sufficiently long. Furthermore, the composite focal length is reduced by the third lens unit at a constant rate over the entire zooming range thereby giving an advantage of easing the aberration correction, while still permitting an increase of the back focal distance to 2.1L or higher to be achieved.

For this purpose, the invention sets forth the following conditions:

$$2.0 \leq |f_1/f_W| \leq 3.2 \quad (1)$$

$$0.33 \leq |f_1/f_2| \leq 0.8 \quad (2)$$

where $f_W$ is the shortest focal length of the entire lens system, and fn is the focal length of the n-th lens unit.

The inequalities of condition (1) represents a range of the ratio of the focal length of the first lens unit to the focal length of the entire system at the wide angle end.

The inequalities of condition (2) represents a range of the focal length ratio between the first and second lens units.

When both conditions are satisfied, it is made sure the back focal length takes the required value, and improved results in correction of all aberrations are attained.

When the upper limits of the inequalities of conditions (1) and (2) are exceeded, the refractive power of the first lens unit becomes too weak to obtain the back focal distance of more than 2.1 times the diagonal length of the effective picture frame. When the lower limits are exceeded, the curvature of field is intensified because the Petzval sum increases to the negative direction, though the adequate elongation of the back focal length is easier to achieve. Further, the difficulty of correcting that curvature of field, spherical aberration and coma is increased.

The use of such a power distribution over the first and second lens units suffices for accomplishing the objects of the invention. Yet, a further improvement of the optical performance can be achieved when the following condition for the third lens unit is satisfied.

That is, the magnification $\beta_3$ of the third lens unit must lie within the following range:

$$0.55 \leq \beta_3 \leq 0.85 \quad (3)$$

Here, the significance of setting forth this range is explained.

When it falls below the lower limit of the range defined by the inequalities of condition (3), the minification becomes much too high, causing the spherical aberration the third lens unit produces to increase in the negative sense.

When the upper limit is exceeded, the minification of the third lens unit becomes much too weak, which in turn calls for an objectionable increase of the powers of the first and second lens units.

Further, to reduce the bulk and size of the third lens unit in such a manner that all image aberrations are well corrected, in the embodiment of the invention, the third lens unit is made up from at least one negative lens and at least one positive lens, and the frontmost surface of the third lens unit is made to turn its convex curvature toward the front, the radius of curvature of this convex surface, and the refractive indices of the negative and positive lenses denoted respectively by $r_{31}$, $n_{3n}$ and $n_{3p}$ satisfying the following conditions:

$$3.0 \leq |r_{31}/f_W| \leq 4.5 \quad (4)$$

$$n_{3n} > n_{3p} \quad (5)$$

The inequalities of condition (4) represent a range of the refracting power of the frontmost lens surface of the third lens unit for well correcting the negative astigmatism produced from the first and second lens units.

When the upper limit is exceeded, the astigmatism cannot sufficiently be corrected, increasing in the negative sense. When the lower limit is exceeded, large positive astigmatism is produced.

The inequality of condition (5) represents the relationship between the refractive indices of the two constituent lenses of the third lens unit for correcting the negative Petzval sum produced from the first and second lens units. If the direction of the sign of inequality is reverse, or the refractive index of the positive lens is larger than that of the negative lens, that correction becomes difficult to perform.

It is to be noted that the negative and positive lenses of the third lens unit are not necessarily cemented together in respect to the improvement of the optical performance. But, the use of the cemented form leads to reduce the number of parts to be assembled in the holder barrel and remove the necessity of establishing tolerances to heighten the efficiency of productivity, and, therefore, makes it possible to supply it at a low price.

Focusing of the zoom lens of the invention is performed by moving either the first or the third lens unit.

Four examples of specific zoom lenses of the invention can be constructed in accordance with the numerical data given in the tables below for the radii of curvature, R, the axial thicknesses or air separations, D, and the refractive indices, N, and Abbe numbers, $\nu$, of the glasses of the lens elements with the subscripts numbered consecutively from front to rear. The last two lens surfaces define a glass member which is replaced by a color filter, a face plate or the like as the necessity arises.

Numerical Example 1:
F = 7.21 — 20.38   FNO = 1:1.8 — 2.3   $2\omega$ = 74.7° — 30.2°

| | | | |
|---|---|---|---|
| R1 = 93.590 | D1 = 4.00 | N1 = 1.60311 | $\nu$1 = 60.7 |
| R2 = −1162.871 | D2 = 0.15 | | |
| R3 = 51.644 | D3 = 2.30 | N2 = 1.80400 | $\nu$2 = 46.6 |
| R4 = 14.517 | D4 = 7.20 | | |
| R5 = 1193.208 | D5 = 3.20 | N3 = 1.67270 | $\nu$3 = 32.1 |
| R6 = −39.958 | D6 = 0.90 | | |
| R7 = −57.505 | D7 = 1.40 | N4 = 1.83481 | $\nu$4 = 42.7 |
| R8 = 21.984 | D8 = 1.20 | | |
| R9 = 18.050 | D9 = 3.00 | N5 = 1.84666 | $\nu$5 = 23.9 |
| R10 = 28.299 | D10 = Variable | | |
| R11 = Stop | D11 = 1.60 | | |
| R12 = 41.699 | D12 = 8.50 | N6 = 1.77250 | $\nu$6 = 49.6 |
| R13 = −57.226 | D13 = 2.28 | | |
| R14 = −16.778 | D14 = 13.30 | N7 = 1.51633 | $\nu$7 = 64.1 |
| R15 = −29.208 | D15 = 0.15 | | |
| R16 = 244.688 | D16 = 1.40 | N8 = 1.84666 | $\nu$8 = 23.9 |
| R17 = 25.824 | D17 = 2.70 | | |
| R18 = 36.251 | D18 = 5.70 | N9 = 1.80400 | $\nu$9 = 46.6 |
| R19 = −36.251 | D19 = Variable | | |
| R20 = 26.180 | D20 = 1.20 | N10 = 1.80518 | $\nu$10 = 25.4 |
| R21 = 15.849 | D21 = 3.80 | N11 = 1.51633 | $\nu$11 = 64.1 |
| R22 = 4169.523 | D22 = 14.30 | | |
| R23 = ∞ | D23 = 5.40 | N12 = 1.51633 | $\nu$12 = 64.1 |
| R24 = ∞ | | | |

| variable distance | focal length | | |
|---|---|---|---|
| | 7.21 | 10.09 | 20.38 |

-continued

| | | |
|---|---|---|
| $D_{10}$ 39.86 | 23.91 | 3.87 |
| $D_{19}$ 1.20 | 9.04 | 37.01 |

Back focal distance 24.02 mm
$f_1 = -18.97$
$f_2 = 33.02$
$f_3 = 78.21$
$|f_1/f_W| = 2.63$
$|f_1/f_2| = 0.57$
$\beta_3 = 0.64$
$|r_{31}/f_W| = 3.63$ Numerical Example 2:
$F = 7.21000 - 20.38$  $FNO = 1:1.8 - 2.8$  $2\omega = 74.7° - 30.2°$

| R1 = 90.555 | D1 = 4.50 | N1 = 1.60311 | ν1 = 60.7 |
|---|---|---|---|
| R2 = 783.433 | D2 = 0.15 | | |
| R3 = 44.044 | D3 = 2.50 | N2 = 1.80400 | ν2 = 46.6 |
| R4 = 15.560 | d4 = 8.00 | | |
| R5 = -158.601 | D5 = 3.00 | N3 = 1.63636 | ν3 = 35.4 |
| R6 = -39.277 | D6 = 1.00 | | |
| R7 = -79.079 | D7 = 1.50 | N4 = 1.83481 | ν4 = 42.7 |
| R8 = 19.633 | D8 = 2.50 | | |
| R9 = 18.488 | D9 = 3.28 | N5 = 1.84666 | ν5 = 23.9 |
| R10 = 28.051 | D10 = Variable | | |
| R11 = 44.243 | D11 = 3.00 | N6 = 1.80518 | ν6 = 25.4 |
| R12 = -142.330 | D12 = 0.80 | | |
| R13 = Stop | D13 = 1.20 | | |
| R14 = 91.990 | D14 = 3.00 | N7 = 1.60311 | ν7 = 60.7 |
| R15 = -91.990 | D15 = 1.17 | | |
| R16 = -17.877 | D16 = 2.09 | N8 = 1.80518 | ν8 = 25.4 |
| R17 = -39.257 | D17 = 12.38 | N9 = 1.62606 | ν9 = 39.2 |
| R18 = -28.265 | D18 = 0.15 | | |
| R19 = 117.819 | D19 = 1.41 | N10 = 1.84666 | ν10 = 23.9 |
| R20 = 24.453 | D20 = 3.41 | | |
| R21 = 36.285 | D21 = 3.50 | N11 = 1.77250 | ν11 = 49.6 |
| R22 = -36.285 | D22 = Variable | | |
| R23 = 24.708 | D23 = 1.20 | N12 = 1.80518 | ν12 = 25.4 |
| R24 = 15.220 | D24 = 2.80 | N13 = 1.51633 | ν13 = 64.1 |
| R25 = 3439.828 | D25 = 14.00 | | |
| R26 = ∞ | D26 = 5.40 | N14 = 1.51633 | ν14 = 64.1 |
| R27 = ∞ | | | |

| variable | focal length | | |
|---|---|---|---|
| distance | 7.21 | 10.09 | 20.38 |
| $D_{10}$ | 34.06 | 19.62 | 1.42 |
| $D_{22}$ | 0.84 | 8.74 | 36.89 |

Back focal distance 23.88 mm
$f_1 = -18.57$
$f_2 = 31.58$
$f_3 = 72.06$
$|f_1/f_W| = 2.58$
$|f_1/f_2| = 0.59$
$\beta_3 = 0.62$
$|r_{31}/f_W| = 3.43$ Numerical Example 3:
$F = 7.21000 - 20.38$  $FNO = 1:1.8 - 2.4$  $2\omega = 74.7° - 30.2°$

| R1 = 111.878 | D1 = 4.50 | N1 = 1.60311 | ν1 = 60.7 |
|---|---|---|---|
| R2 = 504.111 | D2 = 0.15 | | |
| R3 = 46.221 | D3 = 2.50 | N2 = 1.80400 | ν2 = 46.6 |
| R4 = 16.601 | D4 = 8.00 | | |
| R5 = -187.614 | D5 = 3.00 | N3 = 1.63636 | ν3 = 35.4 |
| R6 = -37.179 | D6 = 1.00 | | |
| R7 = -67.869 | D7 = 1.50 | N4 = 1.83481 | ν4 = 42.7 |
| R8 = 20.811 | D8 = 2.50 | | |
| R9 = 18.821 | D9 = 3.28 | N5 = 1.84666 | ν5 = 23.9 |
| R10 = 26.584 | D10 = Variable | | |
| R11 = 45.519 | D11 = 3.00 | N6 = 1.80518 | ν6 = 25.4 |
| R12 = -1152.779 | D12 = 0.80 | | |
| R13 = Stop | D13 = 1.20 | | |
| R14 = 175.398 | D14 = 7.00 | N7 = 1.60311 | ν7 = 60.7 |
| R15 = -48.169 | D15 = 1.25 | | |
| R16 = -17.331 | D16 = 2.09 | N8 = 1.80518 | ν8 = 25.4 |
| R17 = -25.206 | D17 = 11.99 | N9 = 1.62606 | ν9 = 39.2 |
| R18 = -29.639 | D18 = 0.15 | | |
| R19 = 90.820 | D19 = 1.41 | N10 = 1.84666 | ν10 = 23.9 |
| R20 = 26.208 | D20 = 3.75 | | |
| R21 = 38.857 | D21 = 5.00 | N11 = 1.77250 | ν11 = 49.6 |
| R22 = -38.857 | D22 = Variable | | |
| R23 = 29.614 | D23 = 1.20 | N12 = 1.80518 | ν12 = 25.4 |
| R24 = 16.028 | D24 = 3.40 | N13 = 1.51633 | ν13 = 64.1 |
| R25 = -299.430 | D25 = 16.00 | | |
| R26 = ∞ | D26 = 5.40 | N14 = 1.51633 | ν14 = 64.1 |
| R27 = ∞ | | | |

| variable | focal length | | |
|---|---|---|---|
| distance | 7.21 | 10.09 | 20.38 |
| $D_{10}$ | 39.11 | 22.77 | 2.16 |
| $D_{22}$ | 1.20 | 8.98 | 36.73 |

Back focal distance 25.73 mm
$f_1 = -18.35$
$f_2 = 33.36$
$f_3 = 89.69$
$|f_1/f_W| = 2.55$
$|f_1/f_2| = 0.55$
$\beta_3 = 0.67$
$|r_{31}/f_W| = 4.11$ Numerical Example 4:
$F = 7.21000 - 20.38$  $FNO = 1:1.8 - 2.3$  $2\omega = 74.7° - 30.2°$

| R1 = 67.953 | D1 = 4.00 | N1 = 1.60311 | ν1 = 60.7 |
|---|---|---|---|
| R2 = 609.525 | D2 = 0.15 | | |
| R3 = 49.599 | D3 = 2.30 | N2 = 1.80400 | ν2 = 46.6 |
| R4 = 14.829 | D4 = 7.20 | | |
| R5 = -1544.203 | D5 = 2.70 | N3 = 1.63636 | ν3 = 35.4 |
| R6 = -47.568 | D6 = 0.90 | | |
| R7 = -89.419 | D7 = 1.40 | N4 = 1.83481 | ν4 = 42.7 |
| R8 = 17.480 | D8 = 1.20 | | |
| R9 = 17.116 | D9 = 3.00 | N5 = 1.84666 | ν5 = 23.9 |
| R10 = 31.253 | D10 = Variable | | |
| R11 = Stop | D11 = 1.60 | | |
| R12 = 49.665 | D12 = 8.50 | N6 = 1.79952 | ν6 = 42.2 |
| R13 = -52.207 | D13 = 1.71 | | |
| R14 = -15.641 | D14 = 13.30 | N7 = 1.60342 | ν7 = 38.0 |
| R15 = -23.366 | D15 = 0.15 | | |
| R16 = 107.656 | D16 = 1.40 | N8 = 1.84666 | ν8 = 23.9 |
| R17 = 24.734 | D17 = 0.30 | | |
| R18 = 26.927 | D18 = 5.70 | N9 = 1.80400 | ν9 = 46.6 |
| R19 = -53.577 | D19 = Variable | | |
| R20 = 27.067 | D20 = 1.20 | N10 = 1.80518 | ν10 = 25.4 |
| R21 = 15.320 | D21 = 3.40 | N11 = 1.51633 | ν11 = 64.1 |
| R22 = 179.461 | D22 = 14.00 | | |
| R23 = ∞ | D23 = 5.40 | N12 = 1.51633 | ν12 = 64.1 |
| R24 = ∞ | | | |

| variable | focal length | | |
|---|---|---|---|
| distance | 7.21 | 10.09 | 20.38 |
| $D_{10}$ | 40.64 | 24.59 | 4.33 |
| $D_{19}$ | 1.20 | 6.95 | 27.45 |

Back focal distance 23.72 mm
$f_1 = -18.93$
$f_2 = 28.42$
$f_3 = 117.39$
$|f_1/f_W| = 2.63$
$|f_1/f_2| = 0.67$
$\beta_3 = 0.75$
$|r_{31}/f_W| = 3.75$

What is claimed is:

1. A wide angle zoom lens of long back focal distance comprising, from front to rear, a first lens unit having a negative refractive power, a second lens unit having a positive refractive power, and a third lens unit having a positive refractive power, said third lens unit remaining stationary during zooming, and said first and said second lens units being axially moved to effect zooming, and satisfying the following conditions:

$$2.0 \leq |f_1/f_W| \leq 3.2$$

$$0.33 \leq |f_1/f_2| \leq 0.8$$

where $f_W$ is the shortest focal length of the entire lens system, $f_1$ is the focal length of said first lens unit, and $f_2$ is the focal length of said second lens unit.

2. A wide angle zoom lens according to claim 1, satisfying the following condition:

$$0.55 \leq \beta_3 \leq 0.85$$

where $\beta_3$ is the magnification of said third lens unit.

3. A wide angle zoom lens according to claim 1, wherein said third lens unit comprises a negative lens having a negative refractive power and a positive lens having a positive refractive power, and the frontmost surface of said third lens unit turns its convex curvature toward the front, satisfying the following condition:

$$3.0 \leq |r_{31}/f_W| \leq 4.5$$

$$n_{3n} > n_{3p}$$

where $r_{31}$ is the radius of curvature of said frontmost lens surface, and $n_{3n}$ and $n_{3p}$ are the refractive indices of said negative lens and said positive lens, respectively.

4. A wide angle zoom lens of long back focal distance comprising, from front to rear, a first lens unit having a negative refractive power, a second lens unit having a positive refractive power, and a third lens unit having a positive refractive power, said third lens unit remaining stationary during zooming, and said first and said second lens units being axially moved to effect zooming, wherein said second lens unit comprises, from front to rear, a positive lens, a meniscus lens of forward concavity in said second lens unit that has the largest thickness of the lenses of said second lens unit, a negative meniscus lens and a biconvex lens, and an aperture stop is positioned adjacent said positive lens in said second lens unit.

5. A wide angle zoom lens according to claim 4, satisfying the following conditions:

$$2.0 \leq |f_1/f_W| \leq 3.2$$

$$0.33 \leq |f_1/f_2| \leq 0.8$$

where $f_W$ is the shortest focal length of the entire lens system, and $f_1$ and $f_2$ are the focal lengths of said first lens unit and said second lens unit, respectively.

6. A wide angle zoom lens according to claim 4, satisfying the following condition:

$$0.55 \leq \beta_3 \leq 0.85$$

where $\beta_3$ is the magnification of said third lens unit.

7. A wide angle zoom lens according to claim 4, wherein said third lens unit comprises a negative lens having a negative refractive power and a positive lens having a positive refractive power, and the frontmost surface of said third lens unit has its convex curvature toward the front, satisfying the following conditions:

$$3.0 \leq |r_{31}/f_W| \leq 4.5$$

$$n_{3n} > n_{3p}$$

where $r_{31}$ is the radius of curvature of said frontmost surface, and $n_{3n}$ and $n_{3p}$ are the refractive indices of said negative lens and said positive lens, respectively.

* * * * *

UNITED STATES PATENT AND TRADEMARK OFFICE
CERTIFICATE OF CORRECTION

PATENT NO. : 4,838,666

DATED : June 13, 1989

INVENTOR(S) : AKIHIKO SHIRAISHI

It is certified that error appears in the above-identified patent and that said Letters Patent is hereby corrected as shown below:

On the title page:

At [75] Inventor: "Akihiko Shiraishi, Kanagawa, Japan" should read --Akihiko Shiraishi, Kawasaki, Japan--.

At column 1, line 29, "reflux" should read --reflex--.

At column 3, line 4, "range" should read --range,--;

At column 3, line 16, "represents" should read --represent--; and

At column 3, line 19, "represents" should read --represent--.

At column 5, Numerical Example 2, "d4 = 8.00" should read --D4 = 8.00--;

At column 5, Numerical Example 2, "f1 = -18.57" should read --$f_1$ = -18.57--;

UNITED STATES PATENT AND TRADEMARK OFFICE
CERTIFICATE OF CORRECTION

PATENT NO. : 4,838,666

DATED : June 13, 1989

INVENTOR(S) : AKIHIKO SHIRAISHI

It is certified that error appears in the above-identified patent and that said Letters Patent is hereby corrected as shown below:

At column 5, Numerical Example 2, "f2 = 31.58" should read --$f_2$ = 31.58--; and At column 5, Numerical Example 2, "f3 = 72.06" should read --$f_3$ = 72.06--.

At column 7, line 17, "turns" should read --has--.

Signed and Sealed this

Fifth Day of June, 1990

Attest:

HARRY F. MANBECK, JR.

*Attesting Officer*  *Commissioner of Patents and Trademarks*